Feb. 18, 1969 A. M. LUECK 3,428,357
VEHICLE ARM REST
Filed Dec. 22, 1967

*INVENTOR.*
Arthur M. Lueck
BY
*Marn & Jangarathis*
ATTORNEYS

United States Patent Office 3,428,357
Patented Feb. 18, 1969

3,428,357
VEHICLE ARM REST
Arthur M. Lueck, 7 Stony Wood Road,
East Setauket, N.Y. 11733
Filed Dec. 22, 1967, Ser. No. 692,873
U.S. Cl. 296—1
Int. Cl. B60r 7/04, 27/00
7 Claims

ABSTRACT OF THE DISCLOSURE

An arm rest is provided which rests upon and is supported by the drive shaft tunnel extending between the front seats of a vehicle so constructed. The bottom of the arm rest is contoured to fit over the drive shaft tunnel and is stably supported thereby. In an embodiment particularly adapted for use in Volkswagen (trademark) and other vehicles having a hand brake lever and/or other controls mounted upon the drive shaft tunnel, front and/or side openings are provided so that these levers and controls may be operated with the arm rest in place. A storage compartment may be provided in the arm rest structure. The arm rest of the invention is surprisingly stable without any permant attachment to the drive shaft tunnel.

BACKGROUND OF THE INVENTION

Field of invention

This invention relates to an arm rest for use between the front seats of a vehicle having a drive shaft tunnel therebetween. The arm rest of the invention is intended primarily for the use in automobiles of foreign manufacture, of which the Volkswagen is typical.

Prior art

There are many patents relating to arm rests for use in automobiles, but almost of these deal with door or window sill-mounted devices for the left arm (in left-hand drive vehicles) of the driver. Two patents are known which disclose steering shaft supported arm rests for the driver's right arm, but these are not believed to have ever achieved commercial success.

Arm rests centrally located between the front seat passengers are known to be in use in two forms. In many U.S. production cars having a single front seat extending the full width of the interior, a hinged arm rest is built into the back of the seat in the middle thereof, which can be folded down onto the seat portion for use by either the driver or the front seat passenger, and which can be folded into the back portion, to accommodate a third passenger in the front seat.

Sports cars generally and many low-priced foreign cars are provided with separate front seats, usually bucket seats, with a drive shaft tunnel extending longitudinally therebetween, to accommodate the drive shaft connecting the transmission with the differential. In the case of the Volkswagen and other rear-engine cars the tunnel may house other linkages or shafts related to the shifting of gears, engagement of the clutch and the hand brake, but the tunnel has the same general appearance and size and will be referred to generically herein as the drive shaft tunnel.

Certain manufacturers of expensive foreign and domestic sports cars have provided elaborate structures, usually referred to as consoles, between the front seats on top of the drive shaft tunnel. These consoles may contain, in addition to the usual gear shift lever or automatic transmission control, cigarette lighters, ash trays, radio speakers, storage compartments and so forth. Less expensive sports cars are not provided with such luxuries, but at least one manufacturer is known to produce similar consoles made to fit a number of sports car models as accessories. These consoles extend from the transmission housing to the rear deck (all of the cars for which these consoles are made are two-seaters with a deck rather than a rear seat) and are attached thereto. They contain a radio speaker, lighter and ash tray, and a storage compartment, the top of which functions as an arm rest. They cannot be used on vehicles having a handbrake lever or other controls mounted on the drive shaft tunnel.

OBJECTS OF THE INVENTION

It is a general object of the present invention to provide a simple and economical arm rest which rests upon and is stably supported by the drive shaft tunnel in a vehicle.

Another object of the invention is to provide a simple and economical arm rest which can be installed on the drive shaft tunnel of a vehicle and which does not impede the operation of the hand brake lever or other controls mounted thereon.

Still another object of the present invention is to provide an arm rest mountable between the front seats of a vehicle which is entirely stable, but which does not require permanent attachment to the drive shaft tunnel, rear deck, transmission housing or other portions of the vehicle.

Various other objects and advantages of the invention will become clear from the following detailed description of several embodiments thereof, and the novel features will be particularly pointed out in connection with the appended claims.

DESCRIPTION OF EMBODIMENTS

Figure 1:
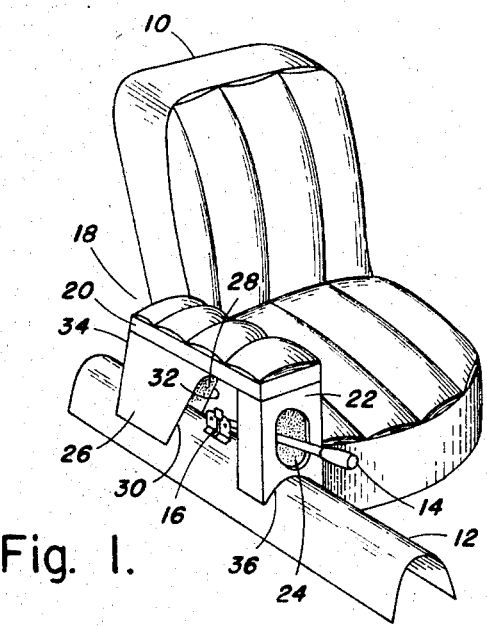
FIGURE 1 is a perspective view of an embodiment of the invention mounted in a Volkswagen.
Figure 2:
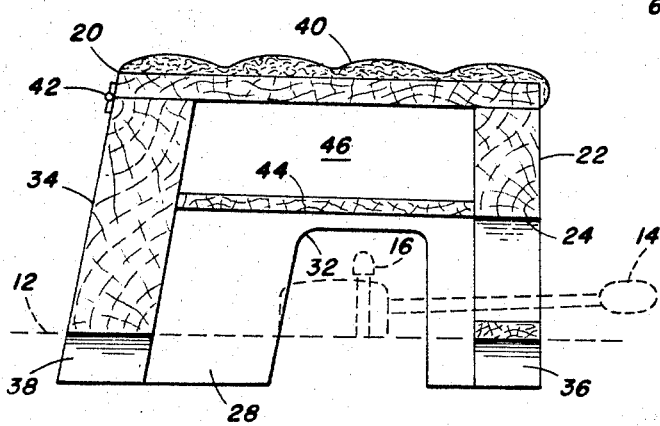
FIGURE 2 is a cross-sectional elevation of a second embodiment of the invention.

With reference to FIGURE 1, the driver's seat of a Volkswagen 10 is shown with the drive shaft tunnel 12 adjacent thereto. The hand brake lever 14 and heat and air controls 16 are mounted on tunnel 12 beside seat 10. The arm rest of the invention is indicated generally at 18, and comprises a top 20, preferably padded for comfort, a front portion 22 having an opening 24 therein to accommodate hand brake lever 14, two side panels 26, 28 each having an opening 30, 32 for access to heat and air controls 16, and a rear portion 34, which may be either straight or sloped for general appearance' sake, as shown. Front portion 22 and rear portion 34 have concave lower surfaces, 36 and 38, respectively, contoured in a generally arcurate configuration adapted to fit over the top of tunnel 12. As shown in FIGURES 1 and 2, only the arm rest itself, i.e., the upper surface of top piece 20, is padded and upholstered, but it will be understood that, for the sake of general appearance, it is preferred that all outer surfaces of the structure be covered with a suitable upholstery fabric.

FIGURE 2 is a sectional elevation of an embodiment similar in most respects to FIGURE 1, and also having a storage compartment. This embodiment is shown as being constructed of wood, but usage of other materials is obvious, as discussed hereinbelow. Rear piece 34 is cut so as to have the desired slope, and is provided with concave lower surface 38, contoured so as to fit over the drive shaft tunnel. Front piece 22 is cut square, with opening 24 for the hand brake lever and contoured lower surface 36 similar to surface 38. Generally upright front and rear pieces 22, 34 are joined into an open box-like configuration by upright side panels 26, 28, each of said panels having an opening 30, 32 for access to the heat and air controls. Top 20, having padded upholstery 40 on the upper surface thereof, is fastened to rear piece 34 by means of a hinge or hinges 42. A flat bottom piece 44 extending between the front and rear pieces and the side panels defines therewith a storage compartment 46 accessible by lifting of hinged top 20. Tunnel 12, lever 14 and controls 16 are indicated by dotted lines in FIGURE 2.

The embodiment of FIGURES 1 and 2 is particularly adapted for Volkswagen cars. It is to be noted that these cars do not have the hand brake and other controls mounted exactly over the center of the drive shaft tunnel, but rather they are very slightly off-set from the center line. To have the arm rest sit stably and vertically thereover, bottom surfaces 36, 38 must likewise be contoured so that the arm rest structure also sits this same distance off-center. Further, these cars are provided with a rubber boot around these controls, and it is preferred that side panels 26, 28 snugly engage the side of this boot, which enhances the stability of the structure Panels 26, 28, being unsupported along most of their lower edges, have some resiliency and this assists in making a snug fit. Lastly, it should be noted that earlier model Volkswagens have heat controls located on the side of the drive shaft tunnel adjacent the floor of the vehicle; this does not effect use or placement of the arm rest in any way.

Figure 3:
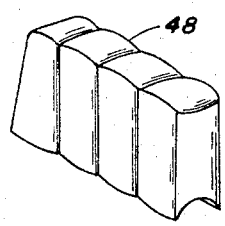
FIGURE 3 is a perspective view of another embodiment of the invention.

Many cars do not have the hand brake and other controls located as the Volkswagen does; embodiments of the invention adapted for such cars need not have the openings and other features associated therewith. The arm rest 48 illustrated in FIGURE 3 is of monolithic plastic construction and, while of the same general outer configuration as the previous embodiments, is molded of a solid plastic such as polyurethane. By molding it with appropriate simulated upholstery seams on the surface thereof, as shown, a fabric cover can be adhesively attached, making a very economical unit.

Figure 4:
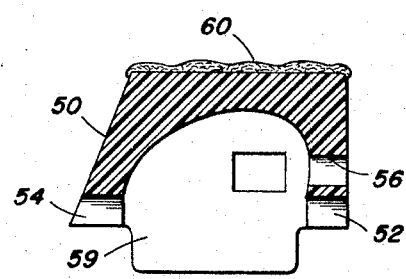
FIGURE 4 is a cross-sectional elevation of still another embodiment of the invention.

A second one-piece plastic embodiment is illustrated in FIGURE 4. A plastic block 50 is molded with contoured front and rear lower surfaces 52, 54, a hand brake lever opening 56 in the front wall, and side openings 58 in side wall 59. A padded, upholstered top 60 is provided. While this embodiment is shown with the necessary openings 56, 58 required for installation in the Volkswagen vehicles, it also has side panels 59 extending downwardly below lower surfaces 52, 54 in a manner designed to snugly engage the sides of the drive shaft tunnel, as is preferred for vehicles not having the hand brake mechanism and associated boot thereon. Side panels 59 are unsupported on their lower edge, whether made of wood, plastic or even sheet metal, and will thus engage the sides of the drive shaft tunnel and retain the arm rest structure firmly in place even though there are no extensions on the tunnel that the structure can fit over. The embodiments of FIGURES 3 and 4 do not have the storage compartment feature of the other embodiments, but are more economical to construct.

That the arm rest structure of the invention is stable in use and sits upright, without any tendency to slide or tip even during sudden stops or sharp turns of the vehicle, is considered one of the most surprising aspects of the invention. As noted hereinabove, the embodiments suited for the Volkswagen and similar cars are adapted to fit snugly about the equipment boot on the upper portion of the tunnel, and on other vehicles it is preferred that the side panels extend down to engage the sides of the drive shaft tunnel. No other installation procedure than fitting the structure in place is required. This has a further advantage on Volkswagen type vehicles, as discussed below.

FIGURE 2 shows, in dotted lines, the approximate position of the Volkswagen hand brake lever 14 in its "off" position. When pulled upwardly to its "on" position, it is (under normal circumstances) well below the top of opening 24 in front piece 22. On occasion, an operator will drive the vehicle for some distance with the hand brake on. If this is done for any period of time, the wear on the rear brake linings (which the hand brake engages with the rear brake drums) may be substantial. This will subsequently result in much greater up-and-down travel of hand brake lever 14. Should this situation exist (even unbeknownst to the driver) and an emergency arises necessitating immediate hand brake application, pulling the lever 14 will also raise the arm rest structure, since it is essentially only resting on the drive shaft tunnel. Thus, in this embodiment the invention is not a safety hazard under even extraordinary conditions.

Figure 5A:
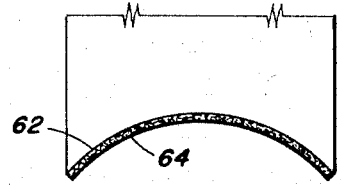
FIGURES 5A and 5B illustrate means for further enhancing the stability of the arm rest.
Figure 5B:
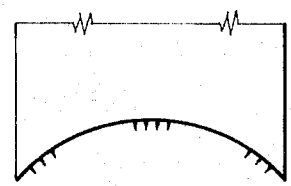

It is within the scope of the invention, however, to provide additional holding means, largely because there is a tendency on the part of the public not to believe that the structure is as stable as it is. Two means of enhancing stability are illustrated in FIGURES 5A and 5B. In FIGURE 5A, the arcurate, contoured lower surfaces 62 of the structure are covered with a suitable, high-friction material 64 such as felt or Velcro (trademark). The engagement of this material with the matting or carpeting covering the drive shaft tunnel reduces further any tendency toward slippage or instability. In FIGURE 5B, the same lower surfaces 62 are provided with extending tacks or grippers which are engageable with the carpeting covering the drive shaft tunnel. Other means of enhancing stability could of course be devised; the structure could be permanently attached to the drive shaft tunnel by means of screws, but the ease of installation without resorting to this expedient is considered an advantage of the invention. This would not be done on Volkswagens, for the safety reasons theretofore enumerated.

It will be understood that various changes in the details, steps, materials and arrangements of parts, which have been herein described and illustrated in order to explain the nature of the invention, may be made by those skilled in the art within the principle and scope of the appended claims and their equivalents. It will be further understood that the contour of the lower surfaces required and the preferred height of the structure will vary from car to car depending on height of the drive shaft tunnel with respect to the seat height, the contour of the tunnel itself, and so forth.

What is claimed is:

1. An arm rest structure for vehicles having separate front seats and a drive shaft tunnel therebetween comprising:

an open-bottomed rectangular structure having front, rear and side portions having generally upright outer sufaces and defining a central cavity;

a top portion closing said rectangular structure and having an upholstered horizontal upper surface;

the bottom surfaces of said front and rear portions having concave depressions therein contoured to fit over, conform to and be supported by said drive shaft tunnel; and the height of said structure being such that, when resting upon and supported by said drive shaft tunnel, said upper surface is at the proper height to serve as an arm rest.

2. The structure as claimed in claim 1, wherein said side portions extend below the bottom surfaces of said front and rear portions, for at least part of their length, and are adapted to engage the sides of said drive shaft tunnel therebetween.

3. The structure as claimed in claim 1, and additionally comprising an opening in said front portion capable of accommodating a vertically movable lever mounted on said drive shaft tunnel within said cavity.

4. The structure as claimed in claim 1, and additionally comprising openings in said side portions, said openings being of sufficient size to provide access to controls mounted on said drive shaft tunnel within said cavity.

5. The structure as claimed in claim 1, wherein said top portion is hinged to one of said upright portions, providing access to said cavity.

6. The structure as claimed in claim 5, and additionally comprising a horizontal bottom within said cavity and over said drive shaft tunnel.

7. The structure as claimed in claim 1, and additionally comprising holding means attached to said bottom surfaces, whereby the stability of said structure is increased.

References Cited

UNITED STATES PATENTS

| | | | |
|---|---|---|---|
| 3,356,409 | 12/1967 | Belsky | 206—19.5 X |
| 3,207,567 | 9/1965 | Brady | 296—1 X |
| 3,269,555 | 8/1966 | Henderson | 206—19.5 |
| 3,285,398 | 11/1966 | Larkin | 206—19.5 |
| 3,109,537 | 11/1963 | Larkin | 40—129 |
| 2,678,682 | 5/1954 | Thomas | 206—19.5 |

PHILIP GOODMAN, *Primary Examiner.*

U.S. Cl. X.R.

206—19.5; 296—24